(12) United States Patent
Zhou

(10) Patent No.: US 9,138,962 B2
(45) Date of Patent: Sep. 22, 2015

(54) CERAMIC-AND-PLASTIC COMPOSITE AND ELECTRONIC DEVICE USING THE COMPOSITE

(71) Applicants: SHENZHEN FUTAIHONG PRECISION INDUSTRY CO., LTD., Shenzhen (CN); FIH (Hong Kong) Limited, Kowloon (HK)

(72) Inventor: Shu-Xiang Zhou, Shenzhen (CN)

(73) Assignees: SHENZHEN FUTAIHONG PRECISION INDUSTRY CO., LTD., Shenzhen (CN); FIH (Hong Kong) Limited, Kowloon (HK)

(*) Notice: Subject to any disclaimer, the term of this patent is extended or adjusted under 35 U.S.C. 154(b) by 110 days.

(21) Appl. No.: 13/900,672

(22) Filed: May 23, 2013

(65) Prior Publication Data

US 2014/0193621 A1  Jul. 10, 2014

(30) Foreign Application Priority Data

Jan. 7, 2013  (CN) .......... 2013 1 00043939

(51) Int. Cl.
B32B 9/00 (2006.01)
(52) U.S. Cl.
CPC ......... *B32B 9/005* (2013.01); *Y10T 428/24975* (2015.01); *Y10T 428/264* (2015.01); *Y10T 428/31663* (2015.04)

(58) Field of Classification Search
None
See application file for complete search history.

(56) References Cited

U.S. PATENT DOCUMENTS

| | | | |
|---|---|---|---|
| 5,167,706 A * | 12/1992 | Kuszaj | 106/287.11 |
| 5,798,171 A * | 8/1998 | Olson | 428/220 |
| 5,925,453 A * | 7/1999 | Kase et al. | 428/323 |
| 2006/0077571 A1* | 4/2006 | Chintala et al. | 359/811 |
| 2009/0257207 A1* | 10/2009 | Wang et al. | 361/752 |
| 2011/0086204 A1* | 4/2011 | Wohl et al. | 428/156 |
| 2011/0155409 A1* | 6/2011 | Du et al. | 174/50 |
| 2012/0018340 A1* | 1/2012 | Chang et al. | 206/524.3 |
| 2013/0202894 A1* | 8/2013 | Tsao et al. | 428/425.5 |

* cited by examiner

*Primary Examiner* — David Sample
*Assistant Examiner* — Donald M Flores, Jr.
(74) *Attorney, Agent, or Firm* — Novak Druce Connolly Bove + Quigg LLP

(57) ABSTRACT

A ceramic-and-plastic composite includes a ceramic article, a nano-silicon containing coating bonded on a surface of the ceramic article, a glue layer bonded with the nano-silicon containing coating, and at least a plastic article bonded to the glue layer. The nano-silicon containing coating partially permeates into the ceramic article. An electronic device using the ceramic-and-plastic composite is also described.

15 Claims, 2 Drawing Sheets

CERAMIC-AND-PLASTIC COMPOSITE AND ELECTRONIC DEVICE USING THE COMPOSITE

BACKGROUND

1. Technical Field

The present disclosure relates to ceramic-and-plastic composites, especially to a strongly bonded ceramic-and-plastic composite, and an electronic device using the composite.

2. Description of Related Art

Ceramic materials are used to manufacture housings of electronic devices. However, ceramic housings poorly bond to plastic elements of the electronic devices.

A current method to improve the bond between the ceramic housing and the plastic element coats the surface of the ceramic housing with a thermal sensitive glue layer before molding the plastic element to the ceramic housing. However, because the ceramic housing has a high densification structure, the glue layer bonds poorly with the ceramic housing. Therefore, it is still difficult to enhance the bond between the ceramic housing and the plastic element.

Therefore, there is room for improvement within the art.

BRIEF DESCRIPTION OF THE DRAWING

Many aspects of the disclosure can be better understood with reference to the following figure. The components in the figure are not necessarily drawn to scale, the emphasis instead being placed upon clearly illustrating the principles of the disclosure. Moreover, in the drawings like reference numerals designate corresponding parts throughout the several views.

DETAILED DESCRIPTION

Figure 1:
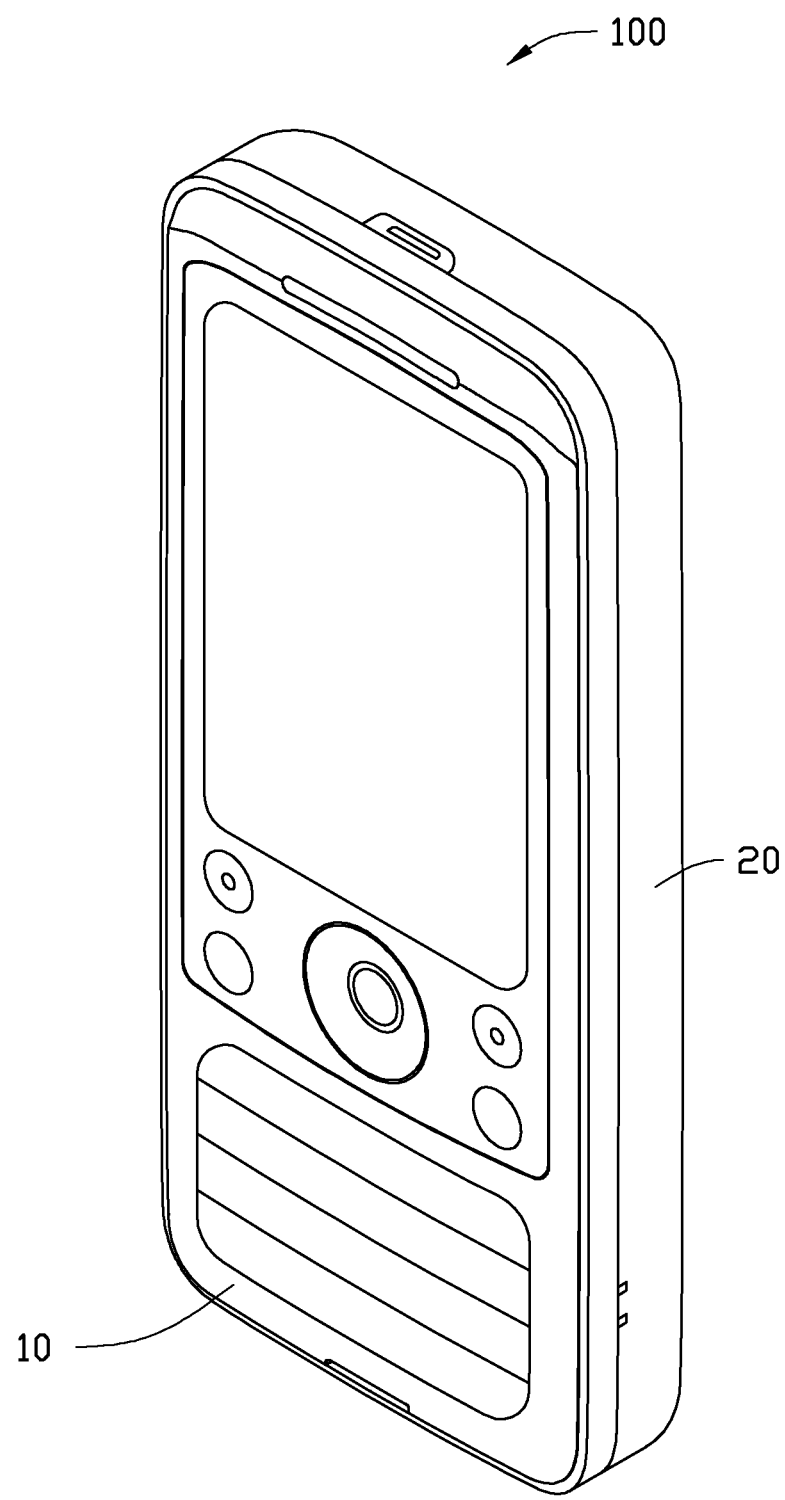
FIG. 1 is a schematic view of an electronic device in accordance with an exemplary embodiment.

FIG. 1 shows an electronic device 100 according to an exemplary embodiment. The electronic device 100 may be a mobile phone, a PDA, a notebook computer, for example. The exemplary embodiment uses a mobile phone as an example to describe the electronic device 100.

The electronic device 100 includes a main body 10, and a ceramic-and-plastic composite 20 (hereinafter "composite") configured to assemble with the main body 10. The composite 20 may be a housing of the electronic device 100. Electrical elements and a display assembly (not shown) can be received in the main body 10.

Figure 2:
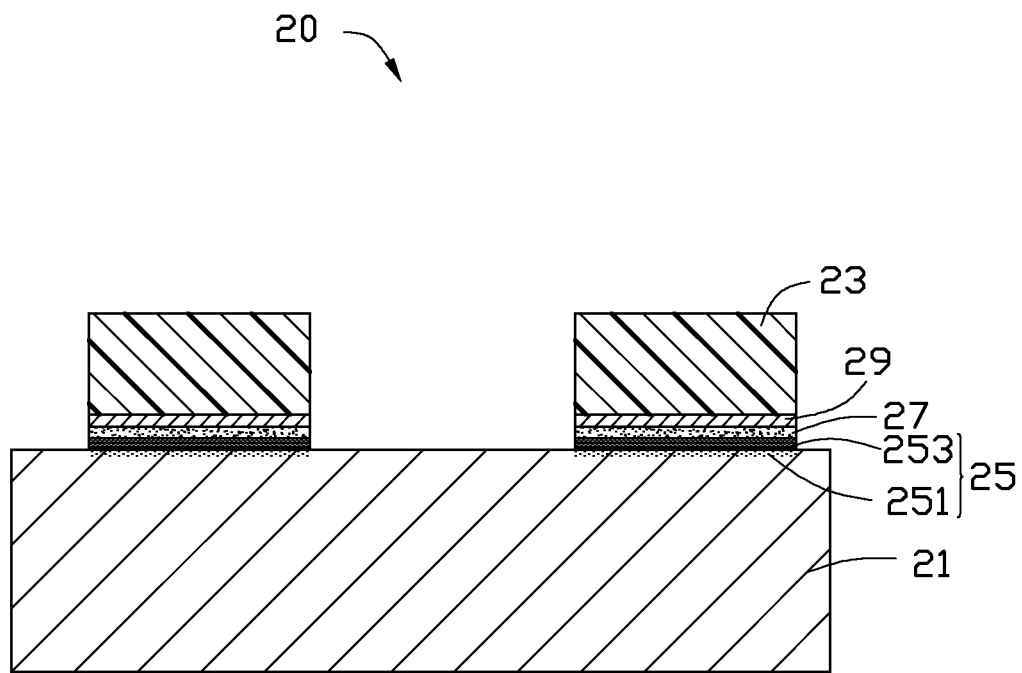
FIG. 2 is a partial cross-sectional view of a ceramic-and-plastic composite in accordance with an exemplary embodiment.

FIG. 2 shows that the composite 20 includes a ceramic article 21, and at least one plastic article 23 combined to the ceramic article 21. The composite 20 further includes a nano-silicon containing coating 25, a silane coupling agent layer 27, and a glue layer 29.

The nano-silicon containing coating 25 is formed on a portion of the surface of the ceramic article 21. The nano-silicon containing coating 25 consists of or includes two parts, which includes a permeating part 251 and a non-permeating part 253. The permeating part 251 permeates into the ceramic article 21 near the surface of the ceramic article 21. The non-permeating part 253 adheres to the surface of the ceramic article 21. The permeating part 251 has a thickness of about 1 micrometer (μm) to about 3 μm. The non-permeating part 253 has a thickness of about 1 μm to about 3 μm. In the exemplary embodiment, the nano-silicon containing coating 25 is a nano silicon dioxide coating which has great surface energy and surface activation, allowing the nano-silicon containing coating 25 to firmly combine to the ceramic article 21.

It is to be understood that, the nano-silicon containing coating 25 can also be formed on the entire surface of the ceramic article 21.

Before forming the nano-silicon containing coating 25, the surface of the ceramic article 21 may be sand blasted to enhance the surface's roughness and the bond between the nano-silicon containing coating 25 and the ceramic article 21.

The silane coupling agent layer 27 is formed on and combined with the nano-silicon containing coating 25. The glue layer 29 is directly formed on the silane coupling agent layer 27. The plastic article 23 directly contacts the glue layer 29. The silane coupling agent layer 27 contains epoxy groups, and the glue layer 29 contains amino functional groups which react and crosslink with the epoxy groups and form a crosslinked structure at the interface of the silane coupling agent layer 27 and the glue layer 29. Thereby the bond between the silane coupling agent layer 27 and the glue layer 29 is greatly improved. Additionally, the non-permeating part 253 of the nano-silicon containing coating 25 contains Si—OH groups at the surface of the non-permeating part 253 (the nano silicon dioxide is prone to absorb active hydrogen to form Si—OH groups), and the silane coupling agent layer 27 also contains a plurality of Si—OH groups which condensation react with the Si—OH groups of the nano-silicon containing coating 25 and form Si—O—Si groups at the interface of the nano-silicon containing coating 25 and the silane coupling agent layer 27. Thereby, the bond between the silane coupling agent layer 27 and the nano-silicon containing coating 25 is greatly enhanced.

In the exemplary embodiment, the glue layer 29 has a thickness of about 38 μm to about 52 μm.

The plastic article 23 may be a clasp. The plastic article 23 can be molded on the glue layer 29 to couple to the ceramic article 21.

The bond between the ceramic article 21 and the plastic article 23 has been tested. The test indicated that the bond force between the ceramic article 21 and the plastic article 23 was about 3.5 MPa/cm$^2$ to about 4 MPa/cm$^2$, which is greater than the bond force between the ceramic housing and the plastic element having not the nano-silicon containing coating 25 and the silane coupling agent layer 27, which was about 2.1 MPa/cm$^2$ to about 2.3 MPa/cm$^2$.

It is to be understood that, the silane coupling agent layer 27 can be omitted, and the glue layer 29 is directly bonded with the nano-silicon containing coating 25.

In the exemplary embodiment, the nano-silicon contained layer 25 is formed by the following method.

Tetraethyl orthosilicate, acetic acid, deionized water, and ethanol are mixed to form a uniform silicon ester solution. The silicon ester solution has a mass percentage concentration of about 15% to about 30%. In the silicon ester solution, the tetraethyl orthosilicate has a volume percentage of about 15%, the acetic acid has a volume percentage of about 1.5%-3%, the deionized water has a volume percentage of about 5%, and the remainder is ethanol. The ethanol acts as an organic solution which dissolves the tetraethyl orthosilicate. The acetic acid accelerates hydrolysis of the tetraethyl orthosilicate. The silicon ester solution is coated on the entire or partial surface of the ceramic article 21, and then the silicon ester coated surface of the ceramic article 21 is naturally dried to form the nano-silicon containing coating 25.

In the exemplary embodiment, the silane coupling agent layer 27 is formed by the following method.

Silane coupling agent and deionized water are mixed uniformly to form a solution having a mass percentage concentration of about 2% to about 5%, then allowing the silane coupling agent to hydrolyze in the solution for about 25 min to about 40 min. The solution is evenly coated on the nano-silicon containing coating 25, and then baked in an oven (not shown) having an internal temperature of about 80° C. to about 120° C. for about 5 min to about 10 min to form the silane coupling agent layer 27.

In the exemplary embodiment, the glue layer 29 can be sprayed or coated on the silane coupling agent layer 27, then the combination can be baked in an oven having an internal temperature of about 40° C. to about 60° C. for about 10 min to about 20 min.

The exemplary composite 20 defines the nano-silicon containing coating 25, which greatly enhances the surface energy of the ceramic article 21, allowing the ceramic article 21 to firmly bond the silane coupling agent layer 27, the glue layer 29, and the plastic article 23. Further, for the nano-silicon containing coating 25 including a permeating part 251 which permeates in the ceramic article 21, the nano-silicon containing coating 25 can be considered a portion of the ceramic article 21, which further improves the bond among the ceramic article 21, the nano-silicon containing coating 25, and the silane coupling agent layer 27. Additionally, the silane coupling agent layer 27 connects the nano-silicon containing coating 25 and the glue layer 29, which also enhances the bond of the ceramic article 21 and the plastic article 23. As such, the ceramic article 21 and the plastic article 23 of the composite 20 can bond with each other strongly.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A ceramic-and-plastic composite, comprising:
   a ceramic article;
   a nano-silicon containing coating bonded on a surface of the ceramic article and partially permeating into the ceramic article;
   a silane coupling agent layer, the silane coupling agent layer reacting with the nano-silicon containing coating to form Si—O—Si groups, the silane coupling agent layer bonding to the nano-silicon containing coating through Si—O—Si groups;
   a glue layer bonded with the silane coupling agent layer, the silane coupling agent layer formed between the nano-silicon containing coating and the glue layer; and
   at least a plastic article bonded to the glue layer.

2. The composite as claimed in claim 1, wherein the nano-silicon containing coating is a nano silicon dioxide coating.

3. The composite as claimed in claim 2, wherein the nano-silicon containing coating comprises a permeating part and a non-permeating part, the permeating part permeates into the ceramic article near the surface of the ceramic article, and the non-permeating part adheres to the surface of the ceramic article.

4. The composite as claimed in claim 3, wherein the permeating part has a thickness of about 1 µm to about 3 µm, the non-permeating part has a thickness of about 1µm to about 3 µm.

5. The composite as claimed in claim 1, wherein the silane coupling agent layer comprises epoxy groups, the glue layer comprises amino functional groups, the epoxy groups react with the amino functional groups forming a crosslinked structure at the interface of the silane coupling agent layer and the glue layer.

6. The composite as claimed in claim 3, wherein the non-permeating part of the nano-silicon containing coating comprises Si—OH groups at the surface of the non-permeating part, the silane coupling agent layer also comprises Si—OH groups, the Si—OH groups of the nano-silicon containing coating condensation react with the Si—OH groups of the silane coupling agent and form Si—O—Si groups at the interface of the silane coupling agent layer and the nano-silicon containing coating.

7. The composite as claimed in claim 1, wherein the glue layer has a thickness of about 38 µm to about 52 µm.

8. An electronic device, comprising:
   a main body; and
   a ceramic-and-plastic composite assembling with the main body, the ceramic-and-plastic composite comprising:
   a ceramic article;
   a nano-silicon containing coating bonded on a surface of the ceramic article and partially permeating into the ceramic article;
   a silane coupling agent layer, the silane coupling agent layer reacting with the nano-silicon containing coating to form Si—O—Si groups, the silane coupling agent layer bonding to the nano-silicon containing coating through Si—O—Si groups;
   a glue layer bonded with to the silane coupling agent layer, the silane coupling agent layer formed between the nano-silicon containing coating and the glue layer; and
   at least a plastic article bonded to the glue layer.

9. The electronic device as claimed in claim 8, wherein the nano-silicon containing coating is a nano silicon dioxide coating.

10. The electronic device as claimed in claim 9, wherein the nano-silicon containing coating comprises a permeating part and a non-permeating part, the permeating part permeates in the ceramic article near the surface of the ceramic article, and the non-permeating part adheres to the surface of the ceramic article.

11. The electronic device as claimed in claim 10, wherein the permeating part has a thickness of about 1 µm to about 3 µm, the non-permeating part has a thickness of about 1 µm to about 3 µm.

12. The electronic device as claimed in claim 8, wherein the silane coupling agent layer comprises epoxy groups, the glue layer comprises amino functional groups, the epoxy groups react with the amino functional groups forming a crosslinked structure at the interface of the silane coupling agent layer and the glue layer.

13. The electronic device as claimed in claim 10, wherein the non-permeating part of the nano-silicon containing coating comprises Si—OH groups at the surface of the non-permeating part, the silane coupling agent layer also comprises Si—OH groups, the Si—OH groups of the nano-silicon containing coating condensation react with the Si—OH groups of the silane coupling agent and form Si—O—Si groups at the interface of the silane coupling agent layer and the nano-silicon containing coating.

14. The electronic device as claimed in claim 8, wherein the glue layer has a thickness of about 38 µm to about 52 µm.

15. A ceramic-and-plastic composite, comprising:
   a ceramic article; and
   at least a plastic article integrally coupled to the ceramic article;
   wherein the composite further comprises a nano-silicon containing coating formed on and coupled to the ceramic article, a silane coupling agent layer bonded with the nano-silicon containing coating, the silane coupling agent layer reacting with the nano-silicon containing coating to form Si—O—Si groups, the silane coupling agent layer bonding to the nano-silicon containing coating through Si—O—Si groups, and a glue layer bonded with the silane coupling agent layer, the nano-silicon containing coating partially permeates into the ceramic article, the at least a plastic article directly bonds with the glue layer.

* * * * *